(12) United States Patent
Sato

(10) Patent No.: US 10,902,751 B2
(45) Date of Patent: Jan. 26, 2021

(54) SECURE ADHESIVE NAME BADGE ASSEMBLY

(71) Applicant: CCL Label, Inc., Framingham, MA (US)

(72) Inventor: Jay Sato, Mission Viejo, CA (US)

(73) Assignee: CCL Label, Inc., Framingham, MA (US)

( * ) Notice: Subject to any disclaimer, the term of this patent is extended or adjusted under 35 U.S.C. 154(b) by 0 days.

(21) Appl. No.: 16/736,875

(22) Filed: Jan. 8, 2020

(65) Prior Publication Data

US 2020/0219420 A1    Jul. 9, 2020

Related U.S. Application Data

(60) Provisional application No. 62/789,703, filed on Jan. 8, 2019.

(51) Int. Cl.
  *G09F 3/10*  (2006.01)
  *G09F 3/02*  (2006.01)

(52) U.S. Cl.
  CPC .............. *G09F 3/10* (2013.01); *G09F 3/02* (2013.01); *B32B 2307/732* (2013.01); *B32B 2405/00* (2013.01); *B32B 2519/00* (2013.01); *G09F 2003/023* (2013.01); *G09F 2003/0257* (2013.01); *G09F 2003/0264* (2013.01)

(58) Field of Classification Search
  CPC ...... G09F 3/10; G09F 3/02; G09F 2003/0257; G09F 2003/023; G09F 2003/0264; B32B 2405/00; B32B 2519/00; B42B 2307/732
  USPC .... 40/299.01, 594, 630, 638, 661.09; 281/5; 283/67, 70, 72, 81, 94, 98, 100, 101
  See application file for complete search history.

(56) References Cited

U.S. PATENT DOCUMENTS 7,709,071 B2     5/2010  Wong et al.
2004/0091659 A1*  5/2004  Banks .................... G07F 17/26
                                                  428/41.8

\* cited by examiner

*Primary Examiner* — Justin V Lewis
(74) *Attorney, Agent, or Firm* — McDonald Hopkins LLC

(57) ABSTRACT

Provided is a badge sheet assembly comprising a facestock layer having at least one cut line that defines at least one badge and a matrix portion. The assembly includes a liner sheet layer, an adhesive layer attached to the liner layer and positioned between the facestock layer and liner layer, and a patterned adhesive layer attached to a bottom surface of the at least one badge. The badge sheet assembly is configured to be fed through a printer device to receive printed indicia on a top surface of the at least one badge wherein the badge and patterned adhesive layer are configured to be removed from the matrix portion, the adhesive layer, and the liner layer after a portion of the badge sheet assembly received indicia thereon.

13 Claims, 7 Drawing Sheets

LINE A-A

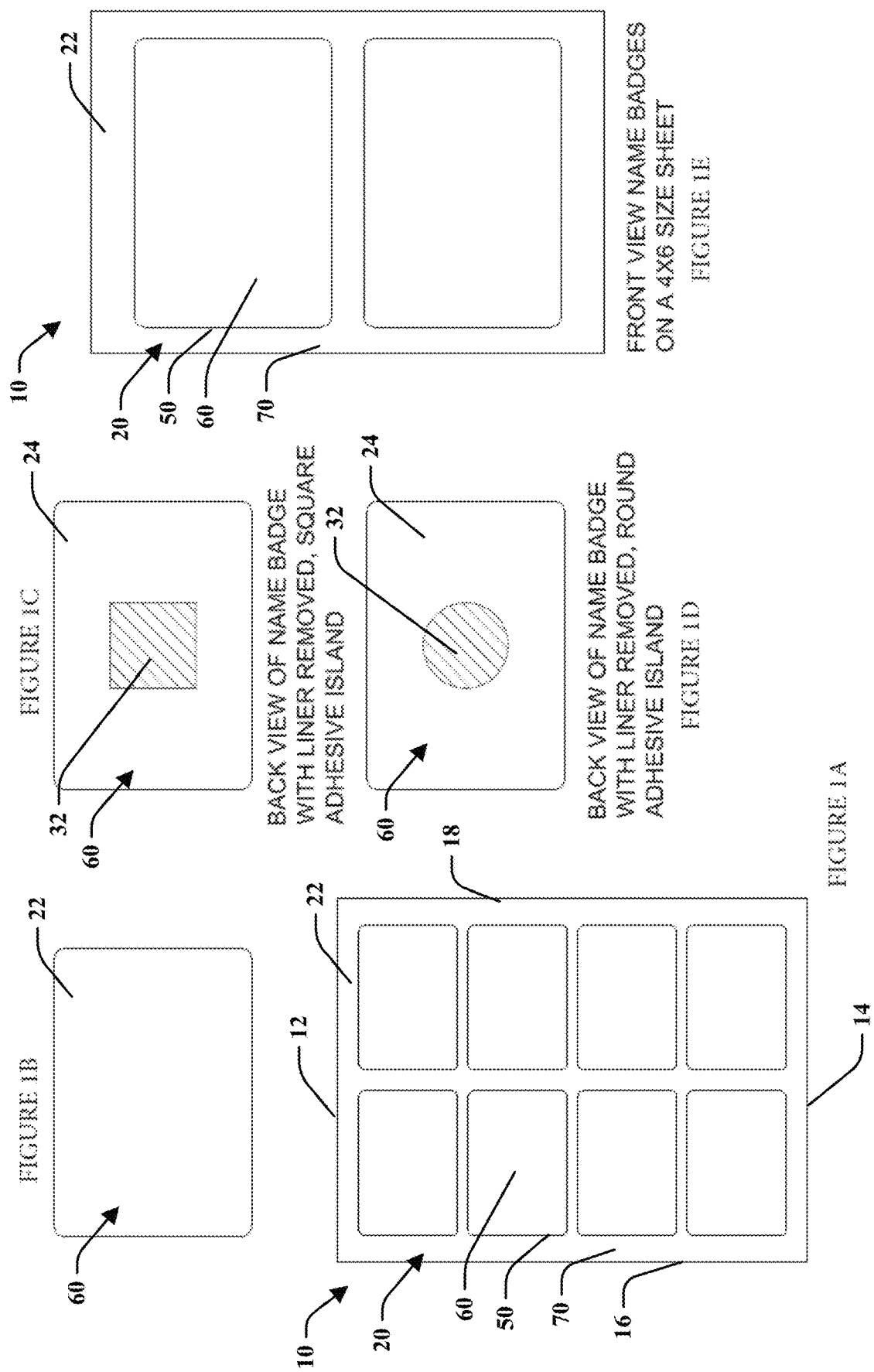

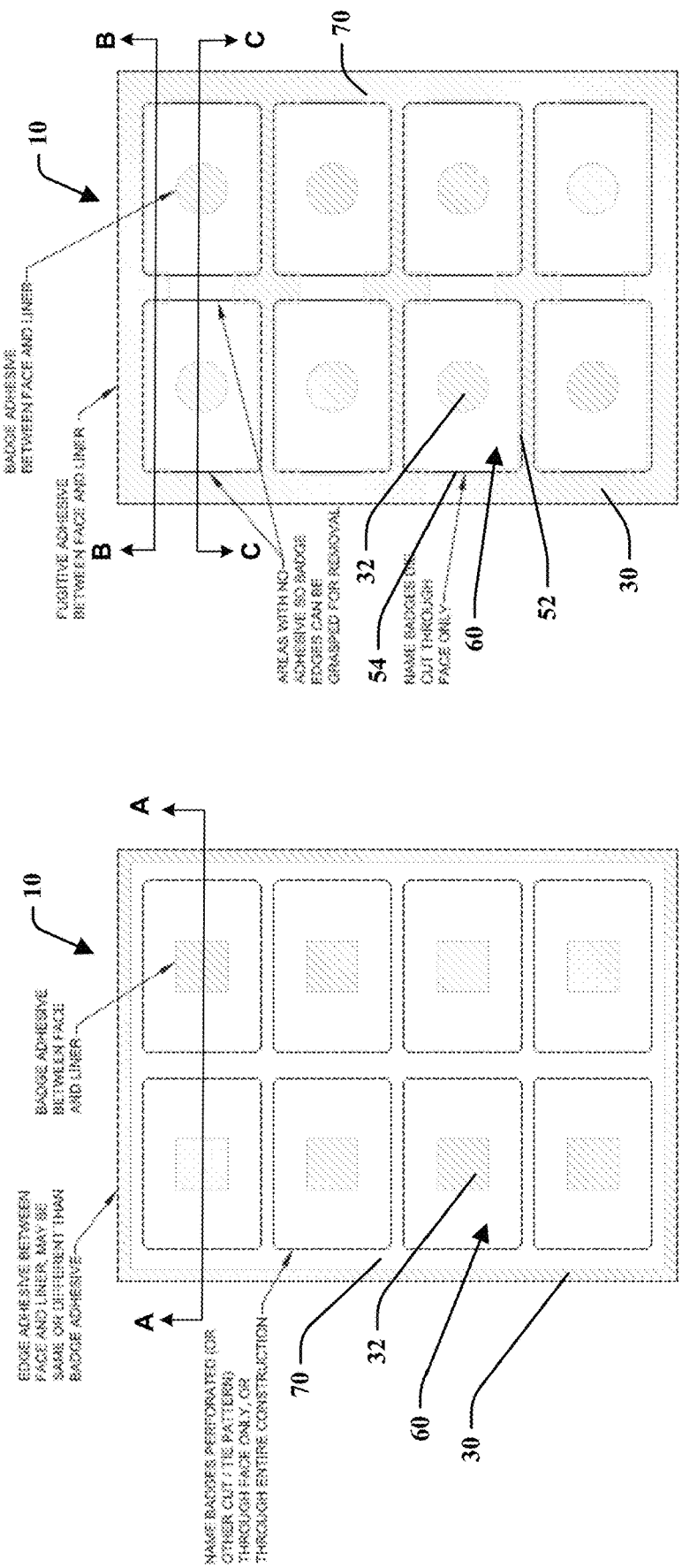

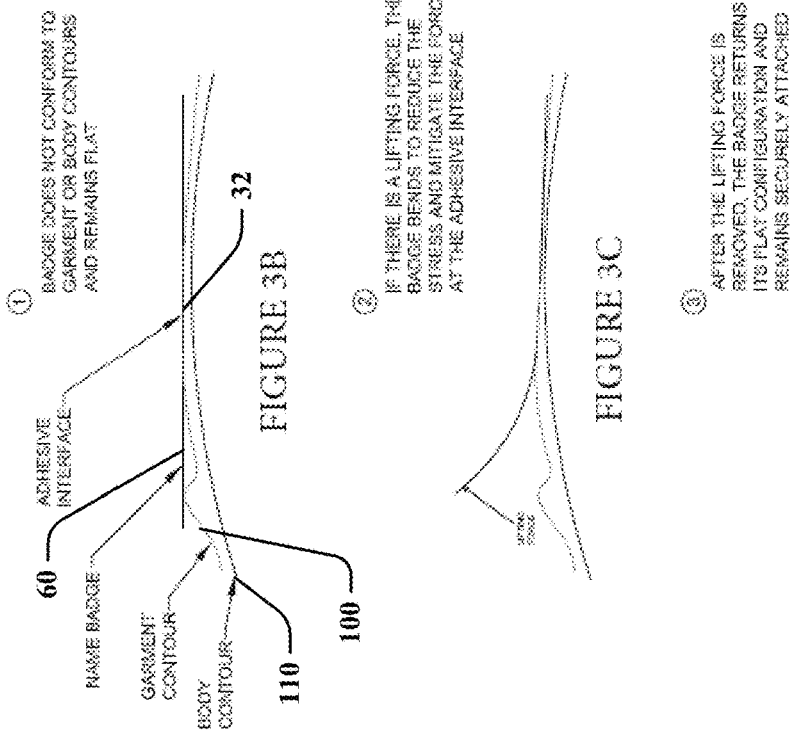
FIGURE 3B
FIGURE 3C
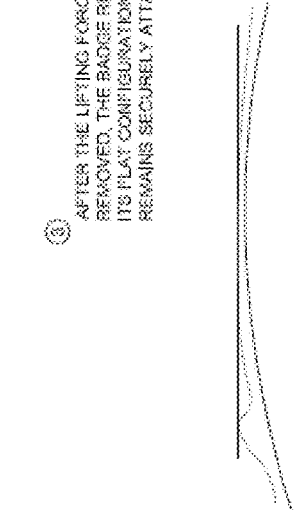
TOP EDGE VIEWS OF NAME BADGE IN USE
FIGURE 3D
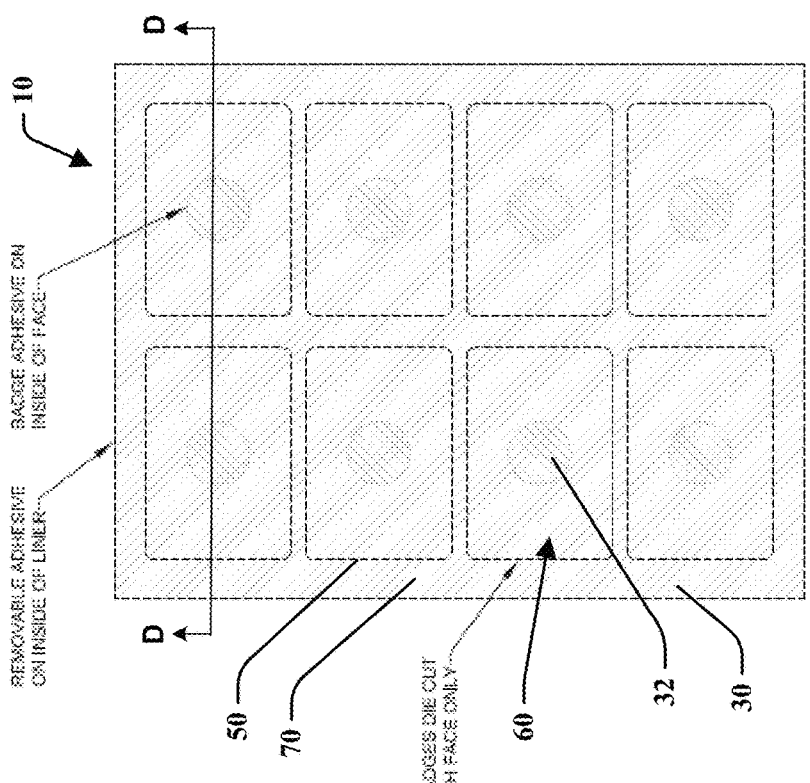
FRONT VIEW NAME BADGES ON A LETTER SIZE SHEET WITH ADHESIVE LOCATIONS SHOWN, EXAMPLE 3
FIGURE 3A

LINE A-A

LINE B-B

LINE C-C

LINE D-D

SECURE ADHESIVE NAME BADGE ASSEMBLY

CROSS-REFERENCE TO RELATED APPLICATION

The present application claims priority to and the benefit of U.S. Provisional Patent Application No. 62/789,703 titled "SECURE ADHESIVE NAME BADGE ASSEMBLY" filed on Jan. 8, 2019 which is incorporated by reference in its entirety.

FIELD OF THE DISCLOSURE

The present disclosure generally relates to a name badge sheet assembly that is configured to be processed through a printer to print indicia thereon. More particularly, the disclosure relates to a label sheet assembly of name badges that is configured to be processed through the printer in an efficient manner.

BACKGROUND

Label sheets for name badges are well known and various types have been proposed to meet the requirements of a wide variety of applications. For example, labels are extensively used in retail businesses for communicating product information to customers. Labels generally include a facestock layer with an adhesive side and an exposed side. The exposed side includes a surface for receiving indicia thereon and is opposite from the adhesive side. A liner sheet may be operably attached to the adhesive side and be configured to allow a user to peel the label portion of the facestock from the liner sheet to be placed on a substrate. A plurality of cut lines may separate the facestock layer into a plurality of labels in various arrangements.

Many label sheets are configured to be feed through a printer to print ink on the surface of the labels. For example, U.S. Pat. No. 7,709,071 to Wong et al. discloses a particular type of label sheet assembly that is configured to be fed through a printer and also allows a user to easily remove labels by hand. This patent is incorporated by reference in its entirety. These label sheet assemblies allow a user broad discretion as to the orientation of the label and the indicia to be printed thereon.

However, problems exist for sheet assemblies that include a plurality of printable name badges that are originally part of printable sheets. Particularly, when a user processes such sheets through a printer, such as an inkjet printer, desktop printer, or laser printer. These processes may cause portions of the name badge sheet assembly to become creased, manipulated or otherwise disengaged. This may cause ink to shift or name badges to be moved relative the remaining facestock layer or liner sheet. Name badges risk damage and indicia may not be accurately printed along the printable portions.

Further, the resulting name badge may not correctly adhere to the garment of a wearer. This may be due to the type of name badge material used as it may be either a conformable material or a non-conformable material. Badges made of conformable material generally conform to the curves and contours of a garment when worn. However, conformable type badges may be less desirable as the badge may not be easily viewable or may look wrinkled due to creases or folds in the garment layer and the name badge. Badges made of a non-conformable material may provide a flat viewable badge surface when worn. However, these non-conformable material type badges may experience an increased risk of processing issues when utilized with a printable sheet processed through a printer. Additionally, the name badge may be easily inadvertently lifted from the garment and fall off.

Therefore, there is a need for a sheet assembly having a facestock and liner material that can be configured to reduce inconsistent processing through a printer as well as provide a desirable badge type label. There is also a need for an improved method of providing a badge sheet to accurately apply ink or indicia thereon through a printer without unduly manipulating the orientation of the badges or sheet assembly that also allows for a generally flat surface to display indicia printed on the badge label and secure attachment while worn by a user.

SUMMARY

The embodiments of the present invention described are not intended to be exhaustive or to limit the invention to the precise forms disclosed in the following detailed description. Rather, the embodiments are chosen and described so that others skilled in the art may appreciate and understand the principles and practices of the present invention.

Disclosed is a badge sheet assembly comprising a facestock layer having at least one cut line that defines at least one badge and a matrix portion. The assembly includes a liner sheet layer, an adhesive layer attached to the liner layer and positioned between the facestock layer and liner layer, and a patterned adhesive layer attached to a bottom surface of the at least one badge. The badge sheet assembly may be configured to be fed through a printer device to receive printed indicia on a top surface of the at least one badge. The at least one badge and patterned adhesive layer may be configured to be removed from the matrix portion, the adhesive layer, and the liner layer after a portion of the badge sheet assembly has received indicia thereon. The patterned adhesive layer may include a perimeter shape of a first dimension and the at least one badge may include a perimeter shape having a second dimension wherein the first dimension is less than the second dimension. The perimeter shape of the patterned adhesive layer may be withdrawn from the perimeter shape of the at least one badge. The facestock layer may be made from a flexible non-conforming material.

In one embodiment, the adhesive layer may include a pattern that extends about a perimeter edge of the matrix portion of the facestock layer and to the edges of the liner layer wherein the adhesive layer includes an inner edge that may be positioned outwardly from the at least one cut line that defines the at least one label. Also, the adhesive layer may include a pattern that extends about a perimeter edge of the matrix of the facestock layer and to the edges of the liner layer wherein the adhesive layer includes an inner edge that may be positioned inwardly along a portion of the at least one cut line that defines the at least one label.

In another embodiment, the pattern of the adhesive layer includes a portion of the inner edge that may be positioned outwardly along a portion of the at least one cut line that defines the at least one label. The cut line may include a section of cuts and ties and a section of die cuts wherein the section of cuts and ties may be positioned relative to a portion of the adhesive layer that extends inwardly relative the cut line while the section of die cuts may be positioned outwardly relative to a portion of the adhesive layer that extends outwardly relative to the cut line. However, the cut line may alternatively be entirely die cut portion without cuts and ties and such various combinations of die cut and cut and tie configurations are contemplated by this disclosure. A user may easily grasp the badge along the section of die cuts to remove the badge from the badge sheet assembly.

In one embodiment, the adhesive layer extends along the entire liner layer. Here, the adhesive layer may be continuous under the patterned adhesive and continuous along the liner layer wherein the patterned adhesive does not abut against the liner layer. Alternatively, the adhesive layer may extend along only a portion of the liner layer. The patterned adhesive may abut against the liner layer and an inner edge of the adhesive layer may abut against or up to a perimeter of the patterned adhesive.

Also provided is a method of using a badge sheet assembly, the method comprising the steps of providing a badge sheet assembly having a facestock layer, an adhesive layer, and a liner sheet. A patterned adhesive may be provided along a bottom side of said facestock layer. A cut line may be cut into the facestock layer to define at least one badge and a matrix portion. The badge sheet assembly may be fed into a printer to print indicia thereon. The badge and patterned adhesive may be separated from the adhesive layer, matrix, and liner sheet.

DESCRIPTION OF THE DRAWINGS

These, as well as other objects and advantages of this invention, will be more completely understood and appreciated by referring to the following more detailed description of the presently preferred exemplary embodiments of the invention in conjunction with the accompanying drawings, of which:

FIG. 1A is a front view of a name badge sheet assembly according to the present disclosure;

FIG. 1B is a front view of a name badge from the name badge label sheet of FIG. 1A according to the present disclosure;

FIG. 1C is a rear view of an embodiment of the name badge of FIG. 1B according to the present disclosure;

FIG. 1D is a rear view of an embodiment of the name badge of FIG. 1B according to the present disclosure;

FIG. 1E is a front view of an embodiment of a name badge sheet assembly according to the present disclosure;

FIG. 2A is a front schematic view of an embodiment of a name badge sheet assembly according to the present disclosure;

FIG. 2B is a front schematic view of an embodiment of a name badge sheet assembly according to the present disclosure;

FIG. 3A is a front schematic view of an embodiment of a name badge sheet assembly according to the present disclosure;

FIG. 3B is a schematic side view of a name badge attached to a garment according to the present disclosure;

FIG. 3C is a schematic side view of a name badge attached to a garment according to the present disclosure;

FIG. 3D is a schematic side view of a name badge attached to a garment according to the present disclosure;

DETAILED DESCRIPTION

Reference will now be made in detail to exemplary embodiments of the present teachings, examples of which are illustrated in the accompanying drawings. It is to be understood that other embodiments may be utilized and structural and functional changes may be made without departing from the respective scope of the present teachings. Moreover, features of the various embodiments may be combined or altered without departing from the scope of the present teachings. As such, the following description is presented by way of illustration only and should not limit in any way the various alternatives and modifications that may be made to the illustrated embodiments and still be within the spirit and scope of the present teachings. In this disclosure, any identification of specific shapes, materials, techniques, arrangements, etc. are either related to a specific example presented or are merely a general description of such a shape, material, technique, arrangement, etc.

The badge sheet assembly 10 of this disclosure may be of any appropriate configuration and is not limited to those shown and described herein. It should similarly be understood that the sheet assembly 10 may be adapted to any appropriate size, including, without limitation, 8.5 inches by 11 inches, A4 size, legal size or any other size. The sheet assembly 10 may be made of any appropriate materials and colors or indicia and this disclosure is not limited in this regard.

Figure 4:
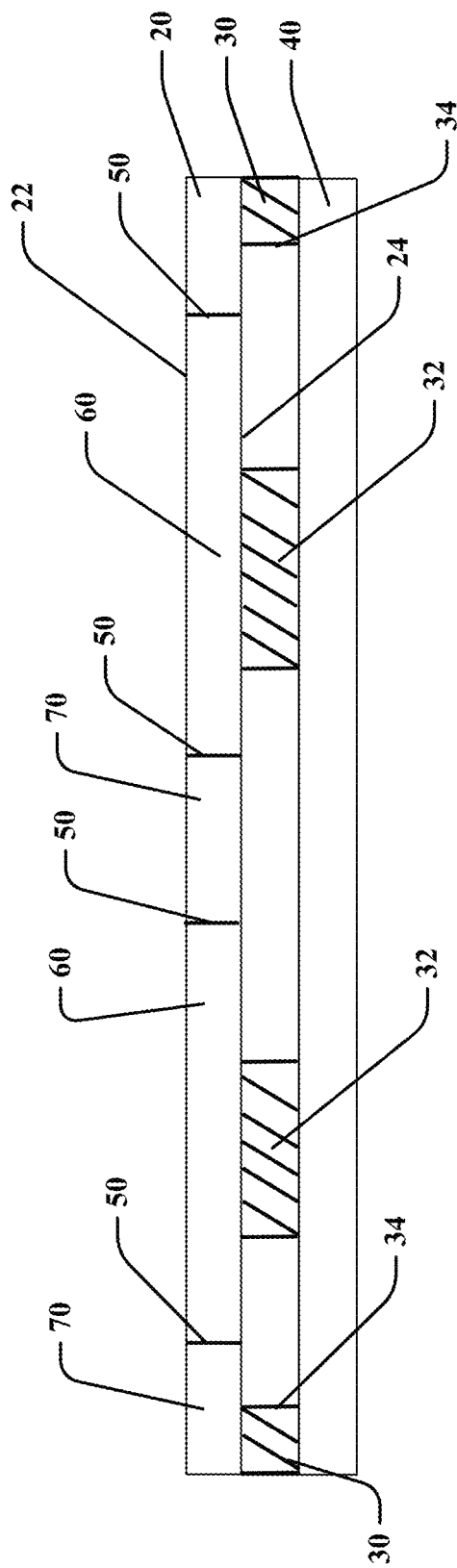
FIG. 4 is a schematic cross sectional view of the name badge sheet assembly of FIG. 2A through line A-A.
Figure 5:
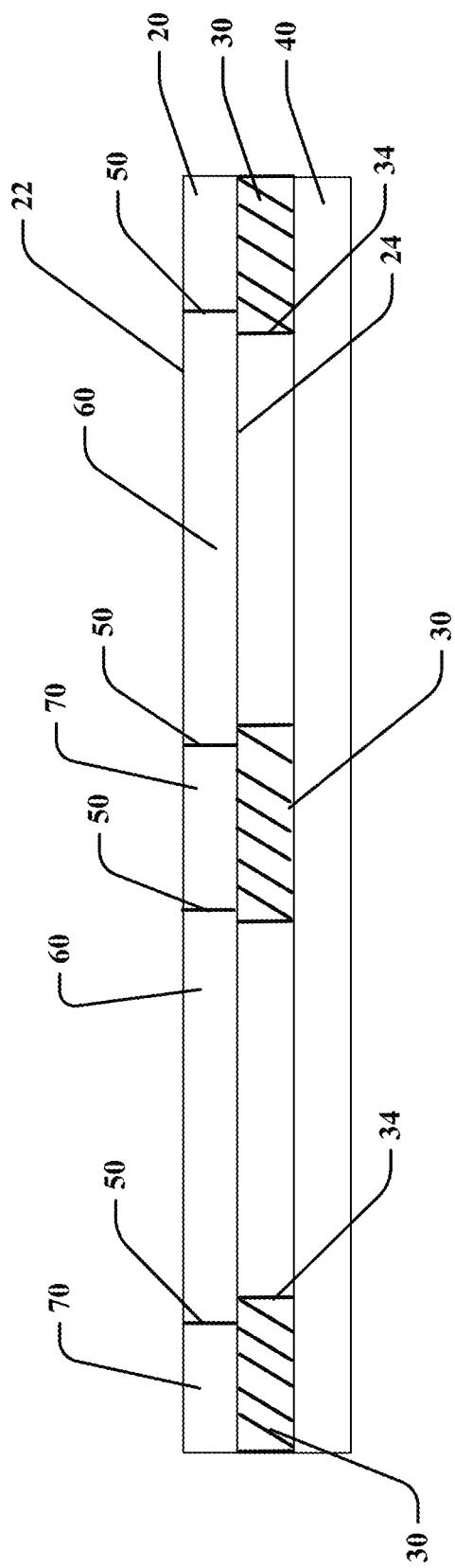
FIG. 5 is a schematic cross sectional view of the name badge sheet assembly of FIG. 2B through line B-B.
Figure 6:
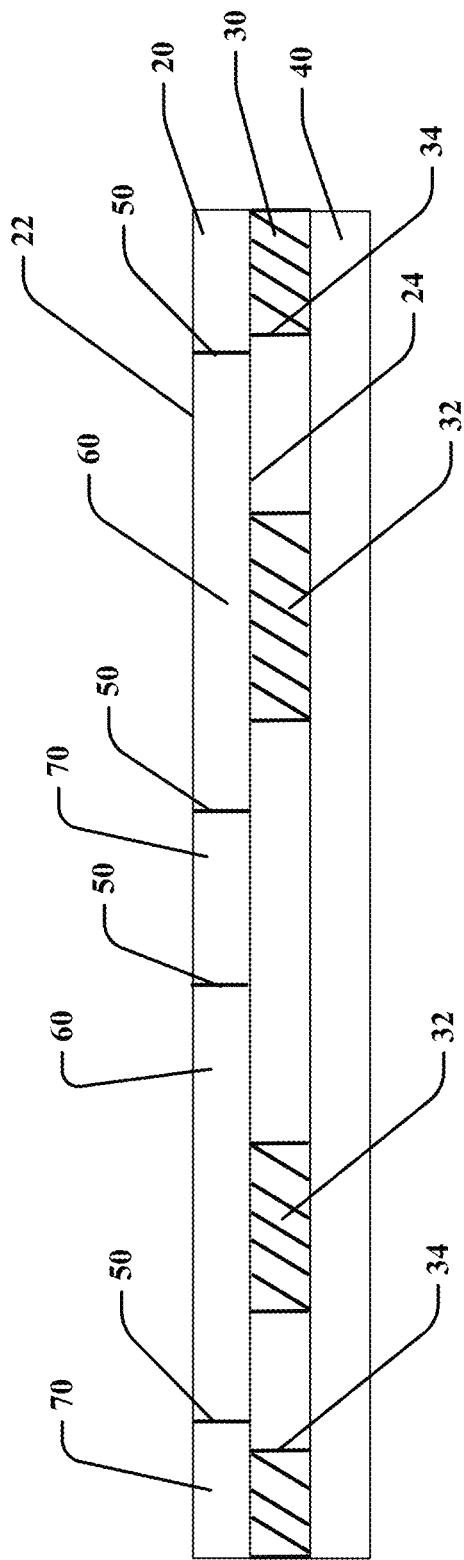
FIG. 6 is a schematic cross sectional view of the name badge sheet assembly of FIG. 2B through line C-C.

The badge sheet assembly 10 may include a facestock layer 20 and a pressure sensitive adhesive layer 30, 32. Sheet assembly 10 may also include a liner sheet 40 wherein the adhesive layer 30 is positioned between the facestock layer 20 and the liner sheet 40. The liner sheet 40 or the facestock layer 20 may include a release coating for supporting the adhesive layer 30. Schematic cross sectional views of embodiments of the badge sheet assembly 10 are illustrated in FIGS. 4-6 that depict the facestock layer 20, the liner sheet 40, and the adhesive layer 30 therebetween. The pattern, structure and function of the adhesive layers 30, 32 are to be described more fully below.

The liner sheet 40 may be made of any material, including, without limitation a calendared paper or polymer film such as a polyester film. The facestock layer 20 may be of any appropriate flexible, non-conformable material, including without limitation a paper, plastic or polymer material such as a polyester material, or other opaque, transparent, translucent or semi-translucent material. The facestock layer 20 may also be a laminate or a label or combination of both. The facestock layer may have a top surface 22 that is configured to receive indicia thereon. Particularly, it is contemplated that the facestock layer 20 may be made of a flexible, non-conformable material.

As illustrated by FIG. 1A, the top surface 22 of facestock layer 20 of the sheet assembly 10 is shown from a front view. The sheet assembly 10 may include at least one cut line 50 that may extend through the facestock layer 20 to separate that sheet assembly into at least one badge 60 and a matrix portion 70. In this embodiment, the facestock layer 20 includes six (6) badges 60 having a generally rectangular shape with rounded corners. However, this application is not limited as to the configuration, amount, or size of the badges 60. One such embodiment is illustrated by FIG. 1E which includes two (2) larger badges 60 of which this application is not limited to these configurations. Additionally, the cut line 50 may be a die cut line through the facestock layer 20 or may include micro-cuts or a plurality of cuts and ties through the facestock layer 20.

The badge sheet assembly 10 may include a first edge 12 and opposite second edge 14 along with a third edge 16 and opposite fourth edge 18. These edges 12, 14, 16, 18 may intersect to form a generally rectangular sheet assembly wherein the badge sheet assembly 10 may be configured to be fed into a conventional printer, such as an inkjet printer, desktop printer, or laser printer, from any edge.

The badge 60 may include top surface 22 and an opposite bottom surface 24 wherein the top surface 22 of the badge 60 may be continuous with the top surface 22 of the rest of the facestock layer 20 including the matrix portion 70. A patterned adhesive layer 32 may be positioned along the bottom surface 24 of the badge(s) 60. The patterned adhesive layer 32 may be any shape including square (FIG. 1C), circular (FIG. 1D) or other shapes. The patterned adhesive layer 32 may include a perimeter shape of a first dimension and the badge 60 may have a perimeter shape having a second dimension wherein the first dimension is less than the second dimension. Here, the perimeter shape of the patterned adhesive layer 32 may be withdrawn from the perimeter shape from the badge 60. The particular shape of the patterned adhesive layer 32 may assist with processing the badge sheet assembly through a printer while allowing a user to more easily remove the printed badge 60 from the sheet assembly 10 while also ensure that the badge is securely adhered to a garment during use. This configuration may preferably be used with badges or facestock material made of a flexible, non-conformable material such as thin polyethylene terephthalate (PET) films, bi-axially oriented polypropylene (BOPP) film, or certain paper materials.

FIG. 2A illustrates an embodiment of the name badge assembly 10 along with the adhesive layer 30 and a plurality of patterned adhesive layers 32. The adhesive layer 30 and the patterned adhesive layers 32 may be different types of adhesives or may be the same such as pressure sensitive adhesive, dry adhesive, or combination of various adhesives known in the art. The plurality of patterned adhesive layers 32 are positioned along the bottom surfaces 24 of each badge while the remainder of the adhesive layer 30 is provided about the edges 12, 14, 16, 18 of the badge label sheet assembly 10. The cross sectional orientation of this embodiment can be further viewed along line A-A in FIG. 4 here it can be seen that the adhesive layer 30 is positioned about the perimeter edge of the matrix 70 of the facestock layer 20 and liner layer 40. The inner edge 34 of the adhesive layer 30 is positioned outwardly from the cut lines 50 that define the plurality of labels 60. The patterned adhesive layer 32 is positioned along the bottom surface 24 of the badges 60 wherein once the badge sheet assembly 10 has been processed through a printer to allow indicia to be printed on the top surface 22 of the badges 60, the badges 60 along with the patterned adhesive layer 32 may be removed from the matrix 70 and liner layer 40 to position the badge 60 and patterned adhesive 32 to the garment of a user to display the indicia therefrom. Further, it is contemplated that the patterned adhesive 32 may be aligned to be centered along the bottom surface 24 of each badge.

FIG. 2B illustrates an embodiment of the name badge assembly 10 along with the adhesive layer 30 and a plurality of patterned adhesive layers 32. The plurality of patterned adhesive layers 32 are positioned along the bottom surfaces 24 of each badge while the remainder of the adhesive layer 30 is provided about the edges 12, 14, 16, 18 of the badge label sheet assembly 10. Additionally, portions of the adhesive layer 30 may extend passed the cut lines 50 that define the badges 60. FIGS. 5 and 6 illustrate cross sectional views along lines B-B and C-C, respectively, of FIG. 2B. In this embodiment, the adhesive layer 30 may be positioned about the perimeter edge of the matrix 70 of the facestock layer 20 and liner layer 40 and extend passed the cut lines 50 along a portion of the badges 60. Along line B-B, the inner edge 34 of the adhesive layer 30 is positioned inwardly from the cut lines 50 that define the plurality of badges 60. Along line C-C, the inner edge 34 of the adhesive layer 30 is positioned outwardly from the cut lines 50. The outward direction is considered to be towards the edges of the badge sheet assembly 10 while the inward direction is considered to be towards a center portion of the badge 60.

Further, in an embodiment, the cut line 50 may include a section of cuts and ties 52 and a section of die cuts 54 along the perimeter of the badge 60. The cuts and ties 52 may be positioned along the portion of the adhesive layer 30 that extends passed the cut line 50 while the die cut 54 may be positioned along the portion of adhesive layer 30 that does not overlap with the cut line 50. This configuration may be based on the configuration of the badges 60 along the sheet assembly 10 to allow for a user to easily grasp each badge 60 along the die cut portion 54 for removal from the sheet assembly 10. However, the cut line may alternatively be entirely die cut without cuts and ties and such various combinations of die cut and cut and tie configurations are contemplated by this disclosure. Further, the patterned adhesive layer 32 may be positioned along the bottom surface 24 of the at least one badge 60 wherein once the badge sheet assembly 10 has been processed through a printer to allow indicia to be printed on the top surface 22 of the badge 60, the badge 60 along with the respective patterned adhesive layer 32 may be removed from the matrix 70 and liner layer 40 to position the badge 60 and patterned adhesive 32 onto the garment of a user to display the indicia therefrom.

Figure 7:
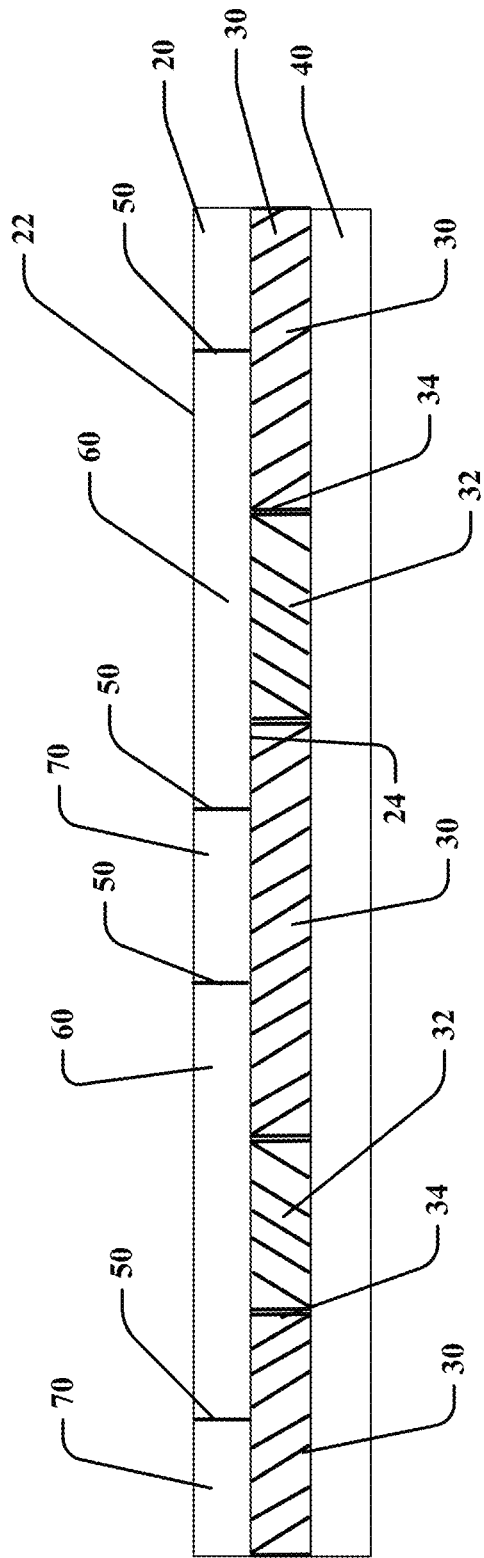
FIG. 7 is a schematic cross sectional view of the name badge sheet assembly of FIG. 3A through line D-D.

FIG. 3A illustrates an embodiment of the name badge assembly 10 along with the adhesive layer 30 and a plurality of patterned adhesive layers 32. The plurality of patterned adhesive layers 32 may be positioned along the bottom surfaces 24 of each badge while the remainder of the adhesive layer 30 may be provided attached to the liner layer and extends along the entire liner layer 40 which extends generally continuously between and up to each of the edges 12, 14, 16, 18 of the badge label sheet assembly 10. FIG. 7 illustrate cross sectional views along lines D-D of FIG. 3A. In this embodiment, the adhesive layer 30 may be positioned about the perimeter edge of the matrix 70 of the facestock layer 20 and liner layer 40 and extend along substantially the entire liner layer 40. In one embodiment, as illustrated along line D-D, the patterned adhesive 32 may be separate from the adhesive layer 30 to allow the badges 60 and patterned adhesive 32 to be removed from the sheet assembly 10 while the matrix 70, liner layer 40 and adhesive layer 30 remain on the sheet assembly 10. In this configuration, the patterned adhesive 32 may extend from the bottom surface 24 of the badge 60 and abut against the liner layer 40 while the inner edge 34 of the adhesive layer 30 may abut against the perimeter of the patterned adhesive 32. Alternatively, in another embodiment (not shown), the adhesive layer 30 may be continuous under the patterned adhesive 32 and be continuous along the liner layer 70 wherein the patterned adhesive 32 does not abut against the liner layer 40.

FIGS. 3B through 3D illustrate a method of using the badge 60 after it has been processed through a printer device and has received a desired indicia thereon. In FIG. 3B, the badge 60 is illustrated as being made from a flexible, non-conformable material such that it is rigid and maintains a straight configuration after the patterned adhesive 32 has been attached to a garment 100 along a body contour 110 of a user. The badge 60 generally does not conform to the garment or body contours and remains relatively flat to allow the indicia to be properly viewable.

FIG. 3C illustrates a common occurrence in which an upward lifting force may occur against the badge 60. The force may cause the badge to bend relative to the adhesive interface between the patterned adhesive 32 and the garment 100. However, the flexible material of the badge 60 in addition to the patterned adhesive 32 reduces the stress of the upward lifting force and mitigates the forces against the adhesive interface. FIG. 3D illustrates that the badge 60 may return to its desired flat configuration after the lifting force has been removed and the badge 60 remains securely attached to the garment 100.

Although the embodiments of the present teachings have been illustrated in the accompanying drawings and described in the foregoing detailed description, it is to be understood that the present teachings are not to be limited to just the embodiments disclosed, but that the present teachings described herein are capable of numerous rearrangements, modifications and substitutions without departing from the scope of the claims hereafter. The claims as follows are intended to include all modifications and alterations insofar as they come within the scope of the claims or the equivalent thereof.

Having thus described the invention, I claim:

1. A badge sheet assembly comprising:
   a facestock layer having at least one cut line that defines at least one badge and a matrix portion;
   a liner layer;
   an adhesive layer attached to the liner layer and positioned between the facestock layer and liner layer; and
   a patterned adhesive layer attached to a bottom surface of the at least one badge;
   wherein the badge sheet assembly is configured to be fed through a printer device to receive printed indicia on a top surface of the at least one badge;
   wherein the badge and patterned adhesive layer are configured to be removed from the matrix portion, the adhesive layer, and the liner layer after a portion of the badge sheet assembly received indicia thereon;
   wherein the adhesive layer includes a pattern that extends about a perimeter edge of the matrix of the facestock layer and to an edge of the liner layer, wherein the adhesive layer includes an inner edge that is positioned outwardly from the at least one cut line that defines the at least one badge.

2. The badge sheet assembly according to claim 1, wherein the patterned adhesive layer includes a perimeter shape of a first dimension and the at least one badge includes a perimeter shape having a second dimension wherein the first dimension is less than the second dimension.

3. The badge sheet assembly according to claim 2, wherein the perimeter shape of the patterned adhesive layer is withdrawn from the perimeter shape from the at least one badge.

4. The badge sheet assembly according to claim 1, wherein the facestock layer is made from a non-conforming material.

5. The badge sheet assembly according to claim 1, wherein the facestock layer is made from flexible material.

6. A badge sheet assembly comprising:
   a facestock layer having at least one cut line that defines at least one badge and a matrix portion;
   a liner layer;
   an adhesive layer attached to the liner layer and positioned between the facestock layer and liner layer; and
   a patterned adhesive layer attached to a bottom surface of the at least one badge;
   wherein the badge sheet assembly is configured to be fed through a printer device to receive printed indicia on a top surface of the at least one badge;
   wherein the badge and patterned adhesive layer are configured to be removed from the matrix portion, the adhesive layer, and the liner layer after a portion of the badge sheet assembly received indicia thereon;
   wherein the adhesive layer includes a pattern that extends about a perimeter edge of the matrix of the facestock layer and to an edge of the liner layer wherein the adhesive layer includes an inner edge that is positioned inwardly along a portion of the at least one cut line that defines the at least one label;
   wherein the pattern of the adhesive layer includes a portion of the inner edge that is positioned outwardly along a portion of the at least one cut line that defines the at least one badge; and
   wherein the cut line includes a section of cuts and ties and a section of die cuts.

7. The badge sheet assembly according to claim 6, wherein the section of cuts and ties is positioned relative to a portion of the adhesive layer that extends inwardly relative the cut line while the section of die cuts is positioned outwardly relative to a portion of the adhesive layer that extends outwardly relative to the cut line.

8. The badge sheet assembly according to claim 6, wherein a user grasps the badge along the section of die cuts to remove the badge from the badge sheet assembly.

9. A badge sheet assembly comprising:
   a facestock layer having at least one cut line that defines at least one badge and a matrix portion;
   a liner sheet layer;
   an adhesive layer attached to the liner layer and positioned between the facestock layer and liner layer; and
   a patterned adhesive layer attached to a bottom surface of the at least one badge;
   wherein the badge sheet assembly is configured to be fed through a printer device to receive printed indicia on a top surface of the at least one badge;
   wherein the badge and patterned adhesive layer are configured to be removed from the matrix portion, the adhesive layer, and the liner layer after a portion of the badge sheet assembly received indicia thereon;
   wherein the adhesive layer extends along the entire liner layer; and
   wherein the adhesive layer is continuous under the patterned adhesive and continuous along the liner layer, wherein the patterned adhesive does not abut the liner layer.

10. A badge sheet assembly comprising:
    a facestock layer having at least one cut line that defines at least one badge and a matrix portion;
    a liner sheet layer;
    an adhesive layer attached to the liner layer and positioned between the facestock layer and liner layer; and
    a patterned adhesive layer attached to a bottom surface of the at least one badge;
    wherein the badge sheet assembly is configured to be fed through a printer device to receive printed indicia on a top surface of the at least one badge;
    wherein the badge and patterned adhesive layer are configured to be removed from the matrix portion, the adhesive layer, and the liner layer after a portion of the badge sheet assembly received indicia thereon;

wherein the adhesive layer extends along only a portion of the liner layer.

11. The badge sheet assembly according to claim 10, wherein the patterned adhesive abuts against the liner layer and an inner edge of the adhesive layer abuts against a perimeter of the patterned adhesive.

12. A method of using a badge sheet assembly, the method comprising:

providing a badge sheet assembly having a facestock layer, an adhesive layer, and a liner sheet;

providing a patterned adhesive along a bottom side of said facestock layer;

cutting a cut line into the facestock layer to define at least one badge and a matrix portion;

feeding the badge sheet assembly into a printer to print indicia thereon; and separating the badge and patterned adhesive from the adhesive layer, matrix, and liner sheet, wherein said adhesive layer includes a pattern that extends about a perimeter edge of a matrix of the facestock layer and to an edge of the liner layer, wherein the adhesive layer includes an inner edge that is positioned either outwardly from the at least one cut line that defines the at least one badge or inwardly along a portion of the at least one cut line that defines the at least one badge.

13. A name badge assembly comprising:

a facestock layer made of a non-conformable or flexible material having a top surface and an opposite bottom surface, wherein the top surface configured to receive and display indicia thereon and the bottom surface configured to be selectively attached to a garment of a user;

a patterned adhesive layer attached to a bottom surface of the facestock layer wherein the patterned adhesive layer includes a perimeter shape of a first dimension and the facestock layer includes a perimeter shape having a second dimension wherein the first dimension is less than the second dimension; and wherein the perimeter shape of the patterned adhesive layer is withdrawn from the perimeter shape of the facestock layer.

* * * * *